(12) United States Patent
Loper

(10) Patent No.: US 7,597,036 B1
(45) Date of Patent: Oct. 6, 2009

(54) PARTING APPARATUS AND METHOD OF USE

(75) Inventor: Thomas Loper, Wilbraham, MA (US)

(73) Assignee: NuCedar Mills, Inc., Chicopee, MA (US)

( * ) Notice: Subject to any disclaimer, the term of this patent is extended or adjusted under 35 U.S.C. 154(b) by 117 days.

(21) Appl. No.: 11/770,844

(22) Filed: Jun. 29, 2007

Related U.S. Application Data

(60) Provisional application No. 60/806,202, filed on Jun. 29, 2006.

(51) Int. Cl.
*B26D 7/06* (2006.01)
(52) U.S. Cl. .................... 83/444; 83/448; 83/871
(58) Field of Classification Search .................. 83/444, 83/448, 449, 450, 418, 420, 442, 425, 409, 83/412, 436.3, 440, 445, 788, 870, 871, 874
See application file for complete search history.

(56) References Cited

U.S. PATENT DOCUMENTS

| | | | | |
|---|---|---|---|---|
| 624,753 A | * | 5/1899 | Clubb | 83/418 |
| 1,779,769 A | * | 10/1930 | Hagar | 83/409 |
| 5,038,646 A | * | 8/1991 | Suwitoadji | 83/442 |
| 5,839,335 A | * | 11/1998 | Tilley | 83/169 |

* cited by examiner

*Primary Examiner*—Stephen Choi
(74) *Attorney, Agent, or Firm*—Deborah A. Basile; Karen K. Chadwell

(57) ABSTRACT

A parting apparatus for the parting of a board. The board comprises a midline defining a first unit and a second unit, wherein each of the first and second units respectively comprises a plurality of tongue and groove features. The parting apparatus comprises a feed wheel which grips and draws the board into a cutting area; a band saw blade located in the cutting area and positioned relative to the board so that the band saw blade cuts the board at the midline as the board moves in a direction transverse to the direction of the band saw blade; and a positioning system that guides the board through the cutting area. The positioning system comprises datum rails, and guide rails, wherein at least one of the guide rails is contoured to register against and into at least one of the tongue and groove features of the board.

10 Claims, 4 Drawing Sheets

PRIOR ART

PARTING APPARATUS AND METHOD OF USE

CROSS REFERENCE TO RELATED APPLICATIONS

This application claims the benefit of U.S. Provisional Application No. 60/806,202 filed on Jun. 29, 2006.

BACKGROUND OF THE INVENTION

1. Field of the Invention

The present invention is generally related to an apparatus for parting. More particularly, the invention is related to an apparatus for parting profiled boards, especially cellular polyvinylchloride (cellular PVC) boards, wherein an exemplary application of such parted, profiled boards is in the use as siding.

2. Background of the Invention

This invention relates to a novel apparatus for the high speed parting of profiled boards, particularly, profiled cellular PVC boards to be used as siding. The parting or slicing or cutting of profiled cellular PVC boards is preferably done in a relatively high speed manner in order to achieve sufficient production through-put to make the cutting process economically feasible. In an exemplary embodiment of the present invention, the cutting speed is about 100 feet per minute. This is a vast improvement over the rate of speed which would be accomplished by cutting cellular PVC boards using conventional band sawing, wherein such conventional band sawing machinery would require a relatively slow cutting speed (less than about 50 feet per minute) to achieve accuracy and surface finish. This slow speed requires multiple machines to even hope to meet projected through-put.

Unlike the parting of conventional siding materials, the high speed parting of cellular PVC boards involves unique cutting procedures to achieve required cutting accuracies and surface finishes and prevent heat buildup; while at the same time, providing required production throughput. Accordingly, the present invention comprises a band type sawing parting apparatus which is especially, extensively, and uniquely designed for parting cellular PVC boards.

BRIEF SUMMARY OF THE INVENTION

The foregoing needs have been satisfied by the development of a parting apparatus of extreme precision and robustness that incorporates unique and innovative cellular PVC processing techniques.

DETAILED DESCRIPTION OF THE INVENTION

The parting apparatus of the present invention is uniquely structured such that it can accurately and efficiently part boards, particularly, profiled cellular PVC boards at required production throughput. The inventive parting apparatus allows for the unique parting of profiled cellular PVC boards, wherein such profiled cellular PVC boards are structured and configured as siding material. Although the parting apparatus disclosed herein can part boards comprising a wide variety of materials, it is particularly well-adapted to meet the specific needs of parting boards comprising cellular PVC. That is, the parting apparatus is designed to achieve required cutting accuracies and surface finishes at the required production throughput without developing excess heat which is extremely detrimental to successful cellular PVC machining.

Other objects and advantages of the present invention will become obvious to persons of ordinary skill in the art, and it is intended that these objects and advantages be within the scope of the present invention. To the accomplishment of the above and related objects, the invention may be embodied in the form illustrated in the accompanying drawings, attention being called to the fact, however, that the drawings are illustrative only, and that changes may be made in the specific constructions illustrated. Accordingly, the drawings are not to be construed as limiting the scope of the invention.

Figures 1, 2:
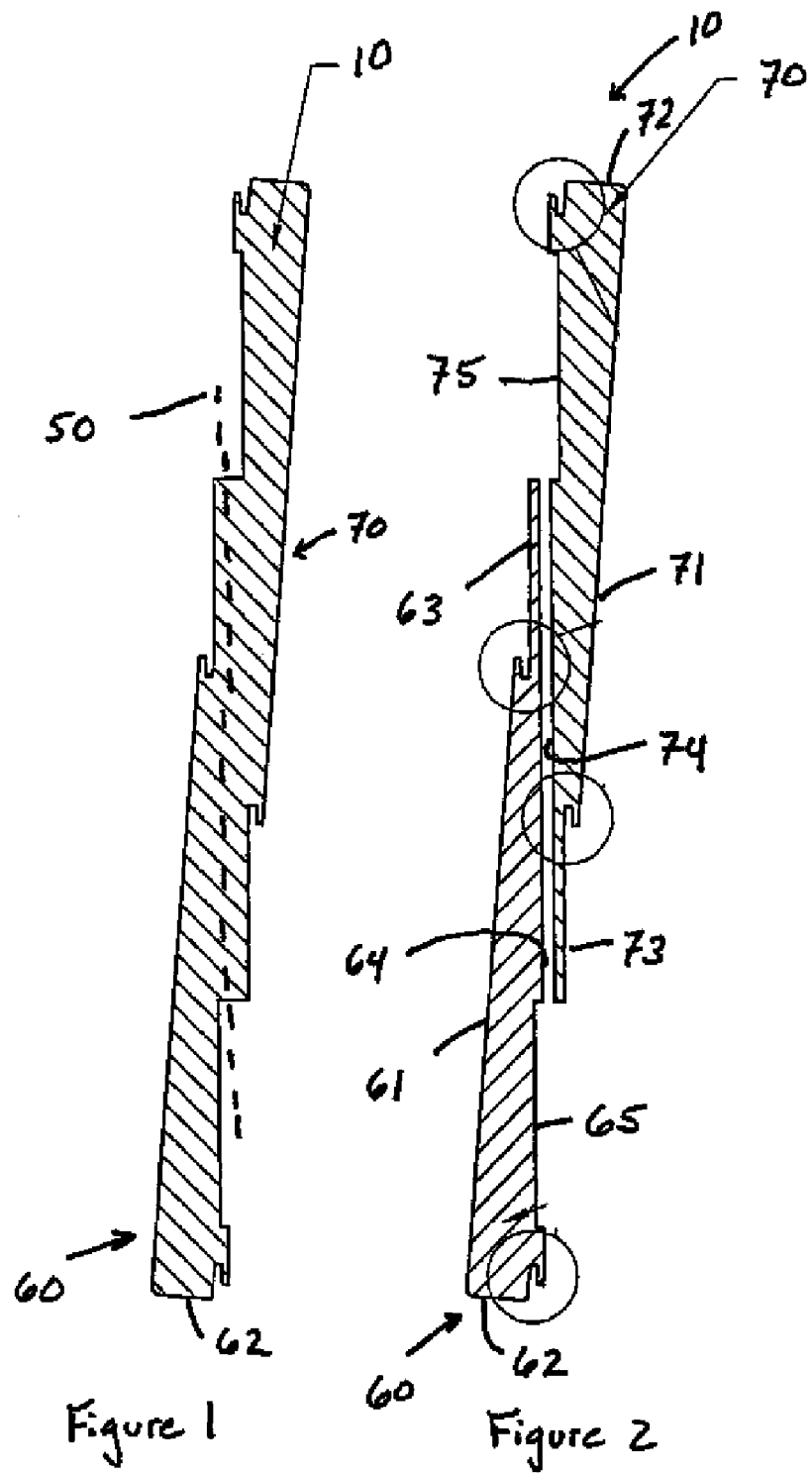
FIG. 1 is a schematic depicting an exemplary profiled cellular poly vinyl chloride board before parting.
FIG. 2 is a schematic depicting the profiled cellular poly vinyl chloride board depicted in FIG. 1 after parting using the parting apparatus of the present invention.

Referring to FIG. 1, a profiled cellular PVC board 10 comprises a midline 50 which equally divides profiled cellular PVC board 10 along a longitudinal axis into a subunit 60 and a subunit 70. Referring to FIGS. 1 and 2, each of first and second subunits 60 and 70 respectively comprises a face 61 and 71, a bottom edge 62 and 72, a flange 63 and 73, a backside 64 and 74, and a recessed portion 65 and 75 of backside 64 and 74.

Figure 3:
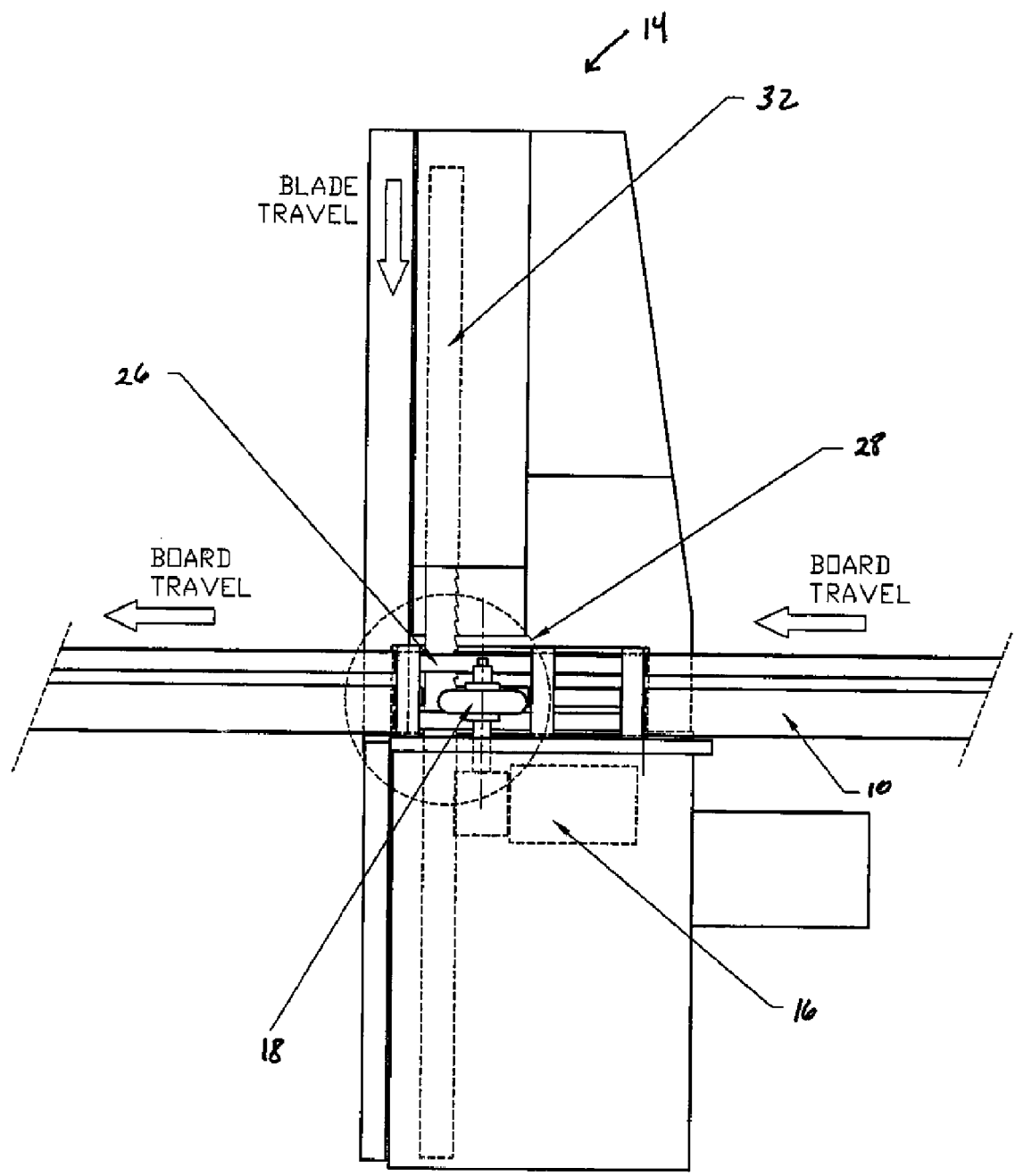
FIG. 3 is a schematic depicting a front view of an exemplary parting apparatus.
Figure 4:
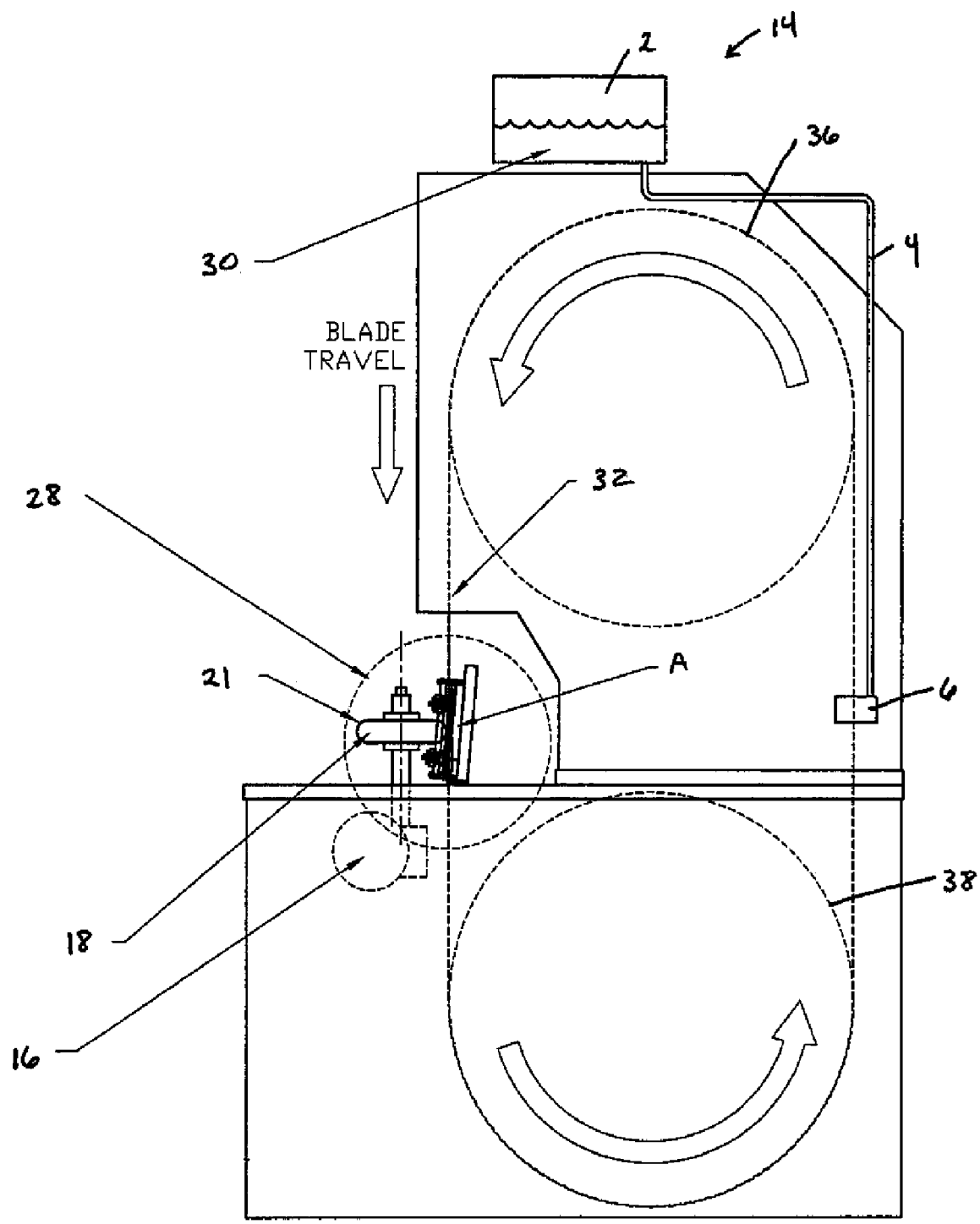
FIG. 4 is a schematic depicting a side view of the parting apparatus depicted in FIG. 3.

Referring to FIGS. 3 and 4, parting apparatus 14 comprises a uniquely designed feed wheel 18, which captures and firmly propels profiled cellular PVC board 10 into parting apparatus 14. Feed wheel 18 is driven by a feed wheel drive 16, which is preferably electrically operated. In an exemplary embodiment, feed wheel 18 is about 8 inches in diameter and has about a 1 inch radius crowned tread 21 about its circumference comprised of about 60 durometer urethane. This crowned tread optimizes the friction between drive wheel 18 and profiled cellular PVC board 10 to provide consistent feed speed regardless of the cut angle.

Because the relative angle of the parting cut to the primary board surface is only about 3 to about 5 degrees, depending upon board width, minute positional variations of the profiled cellular PVC board during the actual parting process will result in extremely exaggerated variations in certain finished dimensions rendering the machined boards useless. Accordingly, parting requires extremely robust, repeatable and accurate board positioning.

To this end, therefore, a unique, active and passive board positioning system has been developed. The positioning system incorporates positioning features and comprises robust, hardened steel, datum rails 22 and 24 upon which the two reference surfaces of profiled cellular PVC board 10 ride; and contoured, hardened steel, guide rails 26, 27, and 29 that further bolster the guiding of profiled cellular PVC board 10 by registering against and into the tongue and groove features of profiled cellular PVC board 10's profile.

Figure 5:
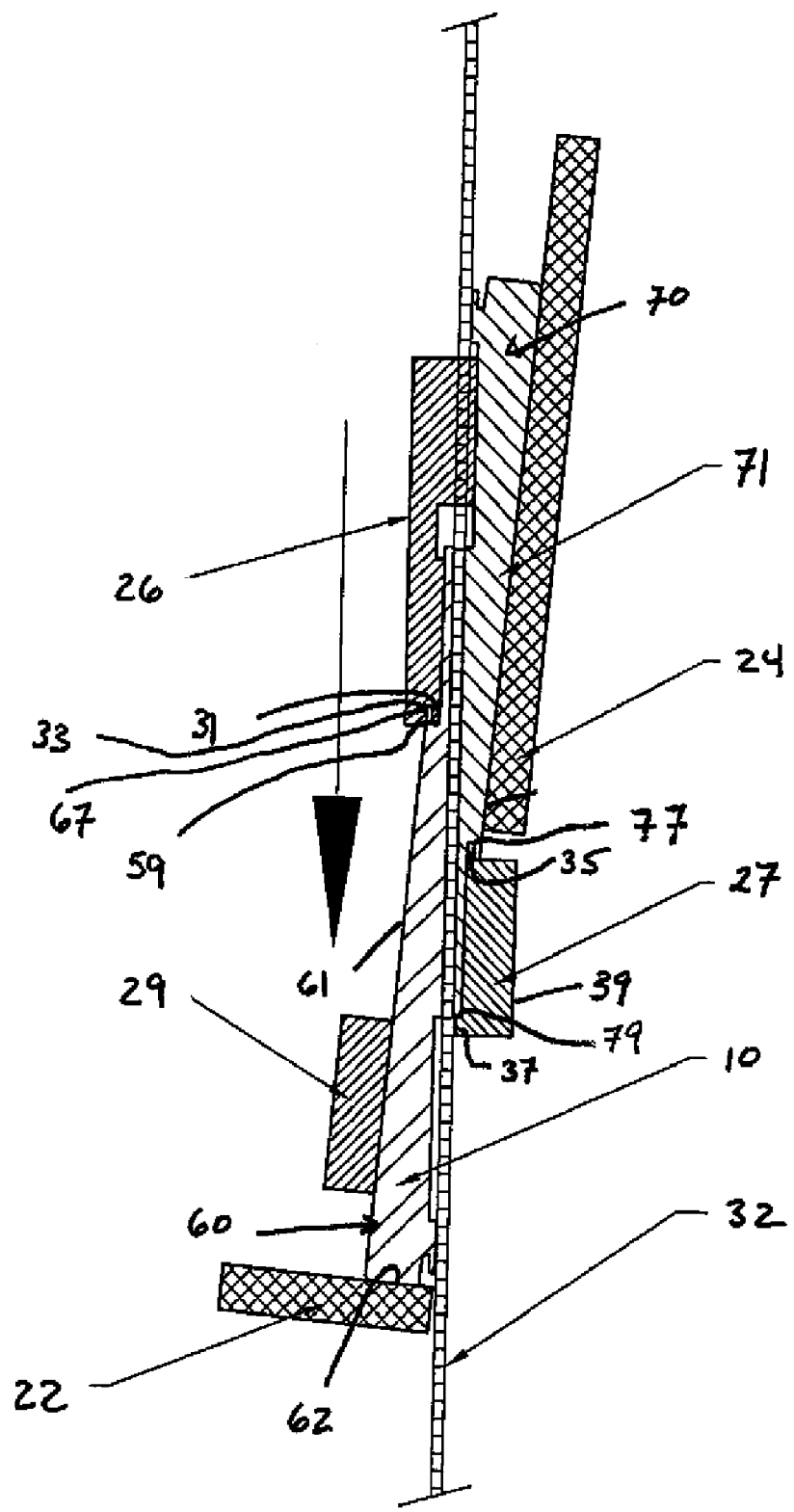
FIG. 5 is a schematic depicting a magnified view of section A of the parting apparatus depicted in FIG. 4.

More particularly, referring to FIGS. 1, 2, and 5, datum rail 22 supports profiled cellular PVC board 10 by lying flush against bottom edge 62, such that cellular PVC board 10 is directed substantially perpendicular to datum rail 22. Datum rail 24 supports board 10 by lying flush against face 71, such that datum rail 24 is substantially parallel to face 71. Furthermore, guide rail 26 comprises a tongue 31 that fits within groove 59 of face 61 and a groove 33 that fits within a tongue 67 of face 61. Guide rail 27 comprises a tongue 35 that fits within a groove 77 of face 71. Guide rail 27 further comprises a protrusion 37 that extends from a body 39, wherein protrusion 37 abuts a top edge 79 of flange 63. Guide rail 29 lies flush and runs substantially parallel to face 61 of first siding unit 60.

As shown in FIG. 5, during the parting process, guide rails 26, 27, and 29 are positioned close to the upstream and downstream edges of a band saw blade 32 to provide secure and precise board guiding, as well as, to provide control and separation of the parted boards to prevent binding. This approach of combining several unique positioning techniques into one cohesive system departs significantly from conventional universal material guiding methods.

Referring to FIGS. 4 and 5, parting apparatus 14 further comprises a band saw blade 32, wound around the reels of an upper wheel 36 and an oppositely positioned lower wheel 38. Band saw blade 32 is specially developed for the cutting of profiled cellular PVC board 10. Band saw blade 32's tooth pitch, form and set are specifically designed to provide efficient chip and debris clearing thus maximizing cutting precision and speed so as to achieve desired finishes and production yields, while minimizing heat buildup. In an exemplary embodiment, band saw blade 32 is comprised of about a 3 inch by about a 0.031 inch thick, high tensile strength steel body bonded to cast and hardened, chromium, tungsten, and cobalt cutting tips. Each tip is set at a pitch of about 1.250 inches and a depth of about 0.354 inch with about an 18 degree hook angle that will yield about a 0.051 saw kerf.

Referring to FIG. 4, parting apparatus 14 further comprises a gravity feed fluid application system 30 feeds and applies a minute amount of a lubricant to band saw blade 32 to minimize both heat and electrostatic build up. In an exemplary embodiment, the lubricant comprises a vegetable based liquid. Furthermore, referring to FIG. 4, in an exemplary embodiment, fluid application system 30 comprises a tank 2, a pipe 4, and a applicator 6, wherein tank 2 holds the lubricant, pipe 4 supplies the lubricant from tank 2 to applicator 6, and applicator 6 dispenses the lubricant onto band saw blade 32.

An exemplary method of parting a profiled cellular PVC board will now be described with reference to the figures, wherein it is to be understood that variations and modifications to the method disclosed herein are contemplated and within the scope of the present invention.

Referring to the figures, profiled cellular PVC board 10 is longitudinally fed into parting apparatus 14 in continuous motion fashion, oriented edge down. In an exemplary embodiment, profiled cellular PVC board 10 is fed into parting apparatus 14 at a velocity of about 85 feet per minute ("ft/min") to about 100 ft/min, at which point profiled cellular PVC board 10 is taken up by feed wheel 18, which is powered by feed wheel drive 16, at a velocity of about 85 ft/min to about 100 ft/min. As profiled cellular PVC board 10 moves through parting apparatus 14, it is properly aligned by datum rails 24 and 22, and fixed in position by guide rails 26, 27, and 29. As profiled cellular PVC board 10 moves via a conveying belt through a cutter area 28, band saw blade 32, which rotates in a direction transverse to the motion of profiled cellular PVC board 10, cuts profiled cellular PVC board 10 at midline 50 to create first siding unit 60 and second siding unit 70. In an exemplary embodiment, band saw blade 32 moves at a velocity of about 50 meters/second to about 60 meters/second as profiled cellular PVC board 10 moves through band saw blade 32. While band saw blade 32 is cutting profiled cellular PVC board 10, fluid application system 30, which is located upstream of upper wheel 36, supplies band saw blade 32 with a lubricant, wherein an exemplary lubricant comprises a vegetable based liquid.

Although the principles of the present invention have been illustrated and explained in the context of certain specific embodiments, it will be appreciated by those having skill in the art that various modifications beyond those illustrated can be made to the disclosed embodiment without departing from the principles of the present invention. Furthermore, it is contemplated that the inventive apparatus disclosed herein can be used not only to part pure cellular PVC boards, but can also part composite boards comprising cellular PVC and other materials, such as, for example, wood fiber. Accordingly, the application of the invention is not limited to pure cellular PVC boards.

What is claimed is:

1. A parting apparatus for the parting of a profiled board, wherein the profiled board comprises a midline defining a first unit and a second unit, and wherein each of the first and second units respectively comprises a plurality of tongue and groove features comprising a groove that separates a face from a flange, and wherein each of the faces comprises a bottom edge opposite to the groove, and wherein the parting apparatus comprises:
    a feed wheel which grips and draws the profiled board into a cutting area of the parting apparatus;
    a feed wheel drive that actuates the feed wheel;
    a band saw blade located in the cutting area and positioned relative to the profiled board so that the band saw blade cuts the board at the midline as the profiled board moves in a direction transverse to the direction of the band saw blade; and
    a positioning system that guides the profiled board through the cutting area, wherein the positioning system comprises:
        a plurality of datum rails comprising:
            a first datum rail that abuts the face of the first unit such that the first datum rail is parallel to the face of the first unit; and
            a second datum rail that abuts the bottom edge of the second unit, such that the profiled board extends perpendicularly from the second datum rail; and
        a plurality of guide rails, wherein at least one of the guide rails is specifically contoured to register against and into at least one of the tongue and groove features of the profiled board, and further wherein the plurality of guide rails comprises:
            a first guide rail comprising a tongue that fits within the groove of the second unit;
            a second guide rail comprising a groove that fits within a tongue of the first unit; and
            a third guide rail abutting the face of the second unit such that the third guide rail is parallel to the face of the second unit.

2. The parting apparatus of claim 1, wherein the feed wheel comprises a diameter of about 8 inches.

3. The parting apparatus of claim 2, wherein the feed wheel comprises a crowned tread comprising a radius of about 1 inch.

4. The parting apparatus of claim 3, wherein the crowned tread comprises about a 60 durometer urethane.

5. The parting apparatus of claim 1, wherein the band saw blade comprises cutting tips comprising at least one of chromium, tungsten, and cobalt.

6. The parting apparatus of claim 5, wherein the cutting tips are set at a pitch of about 1.250 inches.

7. The parting apparatus of claim 6, wherein the cutting tips comprise a depth of about 0.354 inch.

8. The parting apparatus of claim 7, wherein the cutting tips comprise about an 18 degree hook angle.

9. A parting apparatus for the parting of a profiled board, wherein the profiled board comprises a midline defining a first unit and a second unit, and wherein each of the first and second units respectively comprises a plurality of tongue and groove features, and wherein the parting apparatus comprises:
- a feed wheel which grips and draws the profiled board into a cutting area of the parting apparatus;
- a feed wheel drive that actuates the feed wheel;
- a band saw blade located in the cutting area and positioned relative to the profiled board so that the band saw blade cuts the board at the midline as the profiled board moves in a direction transverse to the direction of the band saw blade; and
- a positioning system that guides the profiled board through the cutting area, wherein the positioning system comprises:
  - a plurality of datum rails; and
  - a plurality of guide rails, wherein at least one of the guide rails is specifically contoured to register against and into at least one of the tongue and groove features of the profiled board, and further wherein the plurality of guide rails comprises:
    - a first guide rail comprising a tongue that fits within the groove of the second unit;
    - a second guide rail comprising a groove that fits within a tongue of the first unit; and
    - a third guide rail abutting the face of the second unit such that the third guide rail is parallel to the face of the second unit.

10. The parting apparatus of claim 9, wherein each of the first and second units of the profiled board respectively comprises a groove that separates a face from a flange, and wherein each of the faces comprises a bottom edge opposite to the groove, and wherein the plurality of datum rails comprises:
- a first datum rail that abuts the face of the first unit such that the first datum rail is parallel to the face of the first unit; and
- a second datum rail that abuts the bottom edge of the second unit, such that the profiled board extends perpendicularly from the second datum rail.

* * * * *